United States Patent [19]

Vogelsberg

[11] 3,793,536

[45] Feb. 19, 1974

[54] SHIFTERS FOR SHIFT REGISTER

[75] Inventor: Walter H. Vogelsberg, Carversville, Pa.

[73] Assignee: Wheaton Industries, Millville, N.J.

[22] Filed: Apr. 26, 1972

[21] Appl. No.: 247,525

Related U.S. Application Data

[63] Continuation of Ser. No. 105,027, Jan. 8, 1971, abandoned.

[52] U.S. Cl. .......... 307/221 R, 307/222, 307/252 J, 307/269, 328/37, 328/63, 328/75

[51] Int. Cl. G11c 19/00, H03k 17/00, H03k 17/72

[58] Field of Search 307/221, 222, 262, 269, 252 J, 307/273; 328/37, 44, 62, 75, 63

[56] References Cited

UNITED STATES PATENTS 3,611,204 10/1971 Boenning et al. ............... 307/273 X

*Primary Examiner*—John Zazworsky
*Attorney, Agent, or Firm*—Witherspoon and Lane

[57] ABSTRACT

Electronic shifter circuits for shift registers are disclosed. The shifter circuits are transistorized circuits and provide the proper sequence of signals to operate a shift register.

17 Claims, 5 Drawing Figures

INVENTOR
WALTER H. VOGELSBERG

INVENTOR
WALTER H. VOGELSBERG

INVENTOR
WALTER H. VOGELSBERG

SHIFTERS FOR SHIFT REGISTER

This is a continuation of application Ser. No. 105,027, filed Jan. 8, 1971, and now abandoned.

BACKGROUND OF THE INVENTION

This invention relates to pulsing circuits and more particularly to electronic shifter circuits used with shift registers to provide a proper sequence of signals for operating the shift register.

The shifter circuits disclosed in this application are particularly well suited for use with the forward shift registers disclosed in my copending application Ser. No. 812,253, filed Apr. 1, 1969 now U.S. Pat. No. 3,564,282 and with the forward and reverse shift registers disclosed in copending application Ser. No. 104,643 filed Jan. 7, 1971 now U.S. Pat. No. 3,675,044. Both of said copending applications disclose shift register circuits using silicon controlled rectifiers. In addition these copending applications disclose switching apparatus used to operate the shift registers. These basically mechanical shifters provide totally adequate control of the shift registers for most applications. However, I have found that for certain applications of the shift registers electronic shifter circuits are preferable over mechanical or electromechanical shifters. In these cases the electronic shifters provide more positive and continuous trouble free operation of the shift register and are more readily adaptable to the particular problem at hand.

While the shifter circuits are specifically designed to be used with the silicon controlled shift registers disclosed in my said two copending applications, these circuits can be used with other shift registers such as some of the reed relay registers and others. Whether or not the shifter circuits can be used with a particular register depends upon the nature of the signals required to operate the register. Of course in some cases such as a reed relay register, it may be necessary to slow down the operation of the shifter circuits since these registers do not generally operate quite as rapidly as a silicon controlled rectifier shift register. In any event, the important factor to be remembered is that the shifter circuits disclosed herein are not limited to use with the shift registers disclosed in my said two copending applications. In fact, the shifter circuits are not limited to use with only shift registers. The shifter circuits can be used with any circuit that can be operated by the output signals provided by the shifter circuits. Of course, the circuits are primarily designed to be used with shift registers and are described herein with reference to shift registers.

SUMMARY OF THE INVENTION

A plurality of electronic shifter circuits are disclosed. The shifter circuits are transistorized circuits and some of the circuits use controlled rectifiers of the silicon controlled rectifier type to provide the proper timing and sequence of shift signals to a shift register.

As will be apparent from the detailed description of the invention given below, all of the shifter circuits disclosed can be used with forward registers such as the registers disclosed in my said copending application Ser. No. 812,253 but some of the shifter circuits are particularly designed to be used with forward and reverse registers such as disclosed in my said forward and reverse shift registers disclosed in my said copending application Ser. No. 104,643 and would under normal conditions be used only with forward and reverse registers. In addition, some of the shifter circuits disclosed are limited to use with forward shift registers.

The shifter circuits are used to provide shift signals to a shift register to cause the register to shift from one stage to another stage. These circuits are designed to be readily connected to the appropriate points in a shift register circuit and provide positive shift signals to a register.

It is therefore an object of this invention to provide shifter circuits.

It is a further object of this invention to provide shifter circuits for one directional shift registers.

It is a further object of this invention to provide shifter circuits for bidirectional shift registers.

It is another object of this invention to provide pulse output circuits.

DESCRIPTION OF THE DRAWING

The above mentioned and other objects of the invention will become apparent from the following detailed description of the invention when read in conjunction with the annexed drawing in which.

DESCRIPTION OF THE INVENTION

Figure 1:
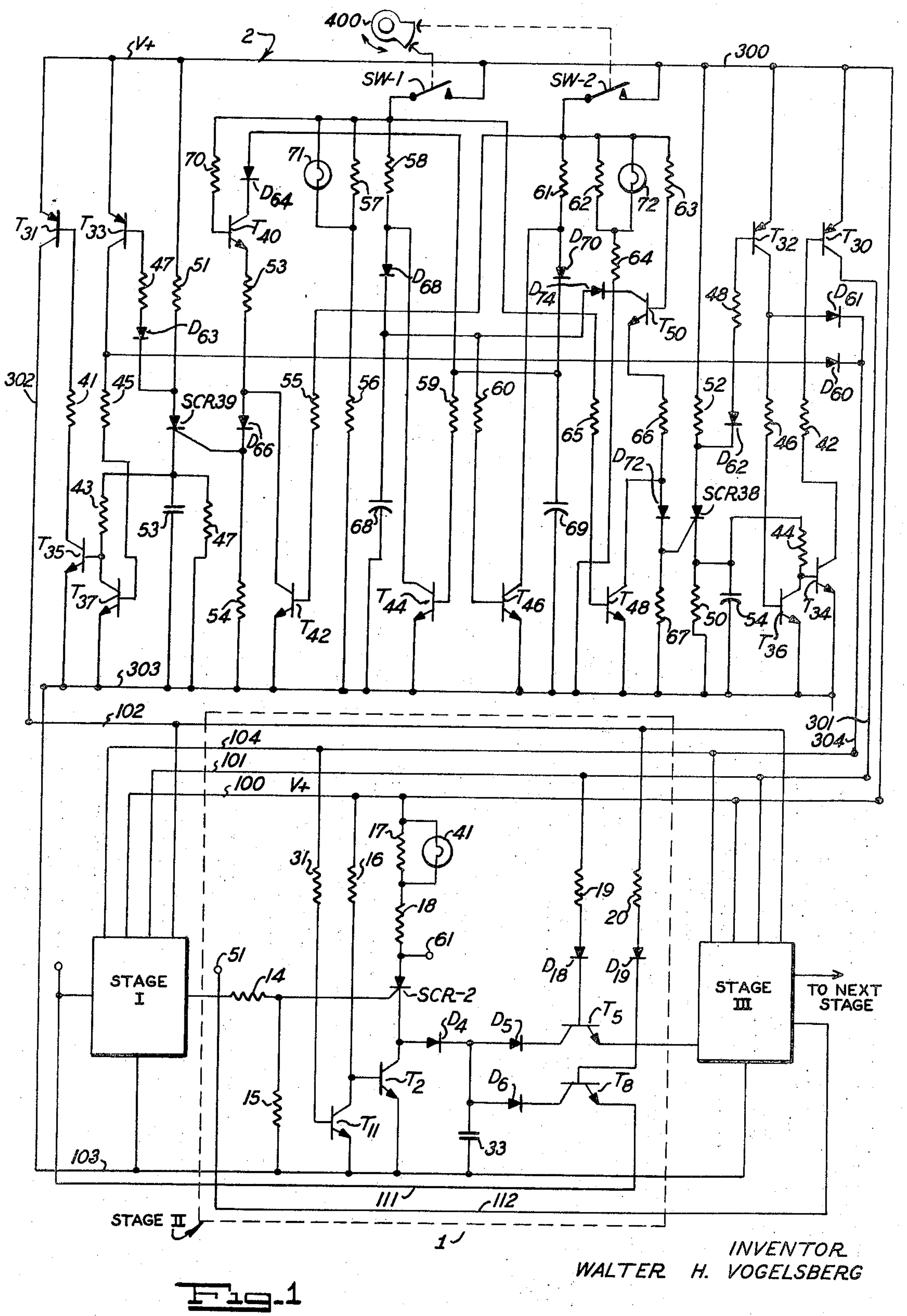
FIG. 1 is a schematic diagram of a bidirectional shifter constructed in accordance with this invention and in addition shows in block and schematic diagram form a forward and reverse shift register that can be used with the shifter circuit.

Referring to FIG. 1, a forward and reverse shift register 1 is shown connected to the bidirectional shifter circuit 2. Register 1 is identical to the shift register shown in FIG. 2 of my said copending forward and reverse shift register application. While register 1 does not form a part of this invention, it is shown in FIG. 1 and will be briefly described for purposes of providing a complete description of shifter circuit 2.

Shift register 1 is shown as having three stages, the stages I, II and III. Stages I and III are shown in block diagram form and stage II is shown in schematic diagram form. Only stage II is shown in schematic since all the stages of the register are identical and for purposes of this discussion the complete description of only one stage is considered necessary. Of course the register can consist of any number of stages identical to stage II.

As shown in FIG. 1, stage II of register 1 comprises a silicon controlled rectifier $SCR_2$, a storage capacitor 33, a forward transfer transistor $T_5$, a reverse transfer transistor $T_8$, the switching transistors $T_2$ and $T_{11}$, input terminal 51 and an input circuit consisting of the resistors 14 and 15. The gate electrode of silicon controlled rectifier $SCR_2$ is coupled to input terminal 51 through resistor 14. The base of transistor $T_{11}$ is coupled to the line 104 through a resistor 31 and the emitter of this transistor is connected directly to line 103. The collector of transistor $T_{11}$ is connected directly to the base of transistor $T_1$ and this base-collector connection is coupled to a V+ line 100. The emitter of transistor $T_1$ is connected directly to line 103 and its collector is connected to the cathode of $SCR_2$. The anode of $SCR_2$ is coupled to V+ line 100 through the series connected resistors 17 and 18. A lamp 41 which ignites when $SCR_2$ is conducting is connected across resistor 17. An output terminal 61 is connected to the anode of $SCR_2$. The cathode of $SCR_2$ is coupled to the collector of forward transfer transistor $T_5$ through a pair of series connected diodes $D_4$ and $D_5$. Storage capacitor 33 is connected between the common point of diodes $D_4$ and $D_5$ and line 103. The base of transistor $T_5$ is coupled to the forward line 101 through the diode $D_{18}$ and the resistor 19. The emitter of transistor $T_5$ is connected to the input of stage III. The collector of reverse transfer transistor $T_8$ is coupled to capacitor 33 through diode $D_6$. The base of transistor $T_8$ is coupled to the reverse line 102 through diode $D_{19}$ and the resistor 20. The emitter of transistor $T_8$ is connected back to the input of stage I.

This forward and reverse shift register which is more fully described in my said forward and reverse shift register copending application is operated by means of shifter circuit 2. The V+ line 300 is connected to V+ line 100; the forward line 301 is connected to forward line 101; the reverse line 302 is connected to reverse line 102; the line 304 is connected to line 104; and the line 303 is connected to line 103. Terminals can be provided on both the shifter 2 and the shift register 1 to facilitate these interconnections or, of course, both units can be fabricated as a single integral unit.

Shifter circuit 2 comprises a forward section and a reverse section. The forward section comprises the transistors $T_{30}$, $T_{32}$, $T_{34}$, and $T_{36}$ and the silicon controlled rectifier $SCR_{38}$. The collector of transistor $T_{30}$ is connected to forward line 301 and its emitter is connected directly to V+ line 300. The base of transistor $T_{30}$ is coupled to the collector transistor $T_{34}$ through a resistor 42. The emitter of transistor $T_{34}$ is connected to line 303 and its base is connected to the collector of transistor $T_{36}$ and to the cathode of $SCR_{38}$ through resistor 44. The emitter of transistor $T_{36}$ is connected to line 303 and the base of this transistor is coupled to the collector of transistor $T_{32}$ through a resistor 46. Line 304 is coupled to the common point of resistor 46 and the collector of transistor $T_{32}$ through a diode $D_{60}$. The emitter of transistor $T_{32}$ is connected to V+ line 300 and the base of this transistor is coupled to the anode of $SCR_{38}$ through a resistor 48 and a diode $D_{62}$. A resistor 50 is connected between line 303 and the cathode of $SCR_{38}$ and a capacitor 54 is connected between line 303 and the cathode of $SCR_{38}$. The anode of $SCR_{38}$ is connected to V+ line 300 through a resistor 52.

The reverse section comprises the transistors $T_{31}$, $T_{33}$, $T_{35}$, and $T_{37}$ and the silicon controlled rectifier $SCR_{39}$. The collector of transistor $T_{31}$ is connected to reverse line 302 and its emitter is connected to V+ line 300. The base of transistor $T_{31}$ is coupled to the collector of transistor $T_{35}$ through a resistor 41. The emitter of transistor $T_{35}$ is connected to line 303 and the base of this transistor is connected to the collector of transistor $T_{37}$.

This base-collector connection of transistors $T_{35}$ and $T_{37}$ is coupled to the cathode of $SCR_{39}$ through a resistor 43. The emitter of transistor $T_{37}$ is connected to line 303 and the base of this transistor is coupled to the collector of transistor $T_{33}$ through a resistor 45. The common point of resistor 45 and the collector of transistor $T_{33}$ is coupled to line 304 through a diode $D_{61}$. The emitter of transistor $T_{33}$ is connected to V+ line 300 and the base of this transistor is coupled to the anode of $SCR_{39}$ through the resistor 47 and the diode $D_{63}$. The anode of $SCR_{39}$ is coupled to V+ line 300 through the resistor 51. The cathode of $SCR_{39}$ is coupled to line 303 through the resistor 49 and the capacitor 53 connected in parallel with resistor 49.

For ease of description the balance of the shifter circuitry is considered as being control circuitry for the forward and reverse sections of the shifter just described. This circuitry comprises the transistors $T_{40}$, $T_{42}$, $T_{44}$, $T_{46}$, $T_{48}$, and $T_{50}$ and the switches $SW_1$ and $SW_2$. Switch $SW_1$ is a single pole — single throw switch having a contact connected to V+ line 300. The switch arm of switch $SW_1$ is coupled to the collector of transistor $T_{44}$ through a resistor 58. The emitter of transistor $T_{44}$ is connected directly to line 303 and the base of this transistor is coupled to the collector of transistor $T_{40}$ through the series connected resistor 59 and diode $D_{64}$. The base of transistor $T_{40}$ is coupled to the switch arm of switch $SW_1$ and the emitter of this transistor is coupled to the gate electrode of silicon controlled rectifier $SCR_{39}$ through the series combination of resistor 53 and diode $D_{66}$. The gate electrode of $SCR_{39}$ is also coupled to line 303 through the resistor 54. The common point of resistor 53 and diode $D_{66}$ is connected to the collector of transistor $T_{42}$. Th emitter of transistor $T_{42}$ is connected to line 303 and the base of this transistor is coupled to the switch arm of switch $SW_2$ through the resistor 55. Switch $SW_2$ is also a single pole — single throw switch having a contact connected to V+ line 300.

The series combination of a resistor 61, a diode $D_{70}$ and a capacitor 69 is connected between the arm of switch $SW_2$ and line 303. The common point of diode $D_{70}$ and capacitor 69 is connected to the common point of resistor 59 and diode $D_{64}$. A second series combination of resistor, diode and capacitor comprising resistor 58, the diode $D_{68}$, and the capacitor 68 is connected between the arm of switch $SW_1$ and line 303. The base of transistor $T_{46}$ is coupled to the collector of transistor $T_{50}$ through the series combination of the resistor 60 and the diode $D_{74}$. The common point of resistor 60 and diode $D_{72}$ is connected to the common point of diode $D_{68}$ and capacitor 68. The emitter of transistor $T_{46}$ is connected to line 303 and the collector of this transistor is coupled to the common point of resistor 61 and diode $D_{70}$. The base of transistor $T_{50}$ is coupled to the arm of switch $SW_2$ through a resistor 63 and the emitter of this transistor is coupled to the gate electrode of $SCR_{38}$ through the series combination of the resistor 66 and the diode $D_{72}$. The gate electrode of $SCR_{38}$ is also coupled to line 303 through the resistor 67. The common point of resistor 66 and diode $D_{72}$ is connected to the collector of transistor $T_{48}$. The emitter of transistor $T_{48}$ is connected to line 303 and the base of this transistor is coupled to the arm of switch $SW_1$.

A lamp circuit is provided with each of the switches $SW_1$ and $SW_2$. The lamp circuit associated with switch $SW_1$ comprises the series combination of resistors 56 and 57 connected between the arm of switch $SW_1$ and line 303 and the lamp 71 connected across resistor 57. Similarly, the lamp circuit associated with switch $SW_2$ comprises the series combination of resistors 62 and 64 connected between the arm of switch $SW_2$ and line 303 and the lamp 72 connected across resistor 62.

Now that the shifter circuitry has been described in detail the operation of this circuitry with reference to shift register 1 will be described. To describe the operation assume that $SCR_2$ of register 1 is conducting due to a signal having been shifted out of stage I in the forward direction at some earlier time. If now switch $SW_1$ of shifter circuit 2 is closed capacitor 68 will begin to charge, transistor $T_{46}$ will conduct and transistor $T_{48}$ will also conduct. Switch $SW_2$ is now closed and switch $SW_1$ remains closed. When switch $SW_2$ is closed transistor $T_{50}$ will conduct but $SCR_{38}$ will not be turned-on because transistor $T_{48}$ is still conducting. Also the closing of switch $SW_2$ will not charge capacitor 69 when switch $SW_1$ is closed because transistor $T_{46}$ is conducting during this time.

Switch $SW_1$ is now opened thereby cutting-off transistors $T_{48}$ and $T_{46}$. $SCR_{38}$ will now conduct because transistor $T_{48}$ is off and transistor $T_{50}$ is conducting. When $SCR_{38}$ conducts transistor $T_{32}$ will be turned-on thereby placing a pulse signal on line 304 through diode $D_{61}$. During this time capacitor 54 will be charged and transistor $T_{34}$ will be off because transistor $T_{36}$ is conducting while transistor $T_{32}$ conducts.

It was initially assumed that $SCR_2$ of register 1 is conducting due to a signal shifted out of stage I. This conduction of $SCR_2$ is through transistor $T_2$ because this transistor is conducting. Since line 304 is connected to line 104, the pulse signal from transistor $T_{50}$ will be applied to the base of transistor $T_{11}$ thereby turning-on this transistor. When transistor $T_{11}$ conducts transistor $T_2$ is cut-off and conduction of $SCR_2$ is through diode $D_4$ thereby charging capacitor 33. $SCR_2$ will conduct until capacitor 33 is charged.

Switch $SW_2$ is now opened thereby cutting-off transistor $T_{50}$. $SCR_{38}$ however continues to conduct until capacitor 54 is charged. When capacitor 54 is charged, $SCR_{38}$ cuts-off thereby cutting-off transistors $T_{32}$ and $T_{36}$. Transistor $T_{34}$ will now conduct and turn-on transistor $T_{30}$. When transistors $T_{34}$ and $T_{30}$ conduct, capacitor 54 will discharge thereby placing a pulse signal on line 301 which is connected to line 101 of register 1. This pulse signal is applied to the base of transistor $T_5$ of register 1 by means of line 101 and turns-on transistor $T_5$. When transistor $T_5$ is turned-on, the signal stored in capacitor 33 will be shifted to the input of stage III and the silicon controlled rectifier of stage III will be turned-on.

The operation just described is the forward mode of operation of shift register 2. That is shifting takes place from one stage to a subsequent stage. In this case the signal was shifted from stage II to stage III. If continued shifting in the forward direction is desired, the process just described is again repeated to shift from stage III to the next stage. That is switch $SW_1$ is closed; then switch $SW_2$ is closed; then switch $SW_1$ is opened; and then finally switch $SW_2$ is opened. In other words shifting in the forward direction is obtained by the following sequence of switch operation: make $SW_1$, make $SW_2$, break $SW_1$, break $SW_2$.

Shifting in the reverse direction is obtained by reversing the sequence of switch operations. Thus, the sequence for reverse operation is: make $SW_2$, make $SW_1$, break $SW_2$, break $SW_1$.

Assume that register 1 had been cleared from the above described forward shifting and that a signal has been shifted in a forward direction from stage I to stage II thereby turning-on $SCR_2$. Assume also that switches $SW_1$ and $SW_2$ of shifter 2 are open as shown. Thus, as before conduction of $SCR_2$ is through transistor $T_2$ since this transistor is conducting.

If it is now desired to shift in a reverse direction, switch $SW_2$ is first closed. When $SW_2$ is closed and $SW_1$ is open, capacitor 69 begins to charge and transistor $T_{44}$ is turned-on. Transistor $T_{42}$ is also turned-on. Switch $SW_1$ is now closed turning-on transistor $T_{40}$; however $SCR_{39}$ is not turned-on because transistor $T_{42}$ is conducting since $SW_2$ is still closed. Note also that capacitor 68 cannot be charged by the closing of switch $SW_1$ since transistor $T_{46}$ is conducting.

Switch $SW_2$ is now opened and $SCR_{39}$ will now conduct because transistor $T_{42}$ is cut-off. When $SCR_{39}$ conducts transistors $T_{33}$ and $T_{37}$ will turn-on and capacitor 53 will begin to charge. As soon as transistor $T_{33}$ is turned on a pulse is applied to line 304 through diode $D_{60}$. As was the case with the forward operation, the pulse on line 304 will turn-on transistor $T_{11}$ of register 1 via line 104 thereby cutting-off transistor $T_2$ of the register. As before, when $T_2$ is cut-off, $SCR_2$ conducts through diode $D_4$ and charges capacitor 33. $SCR_2$ conducts until capacitor 33 is charged.

If switch $SW_1$ is now opened, $SCR_{39}$ will continue to conduct until capacitor 53 is charged. $SCR_{39}$ then cuts-off thereby cutting-off transistors $T_{33}$ and $T_{37}$. When transistor $T_{37}$ is cut-off, transistors $T_{35}$ and $T_{31}$ conduct and the signal stored in capacitor 54 will appear on line 302 since the collector of transistor $T_{31}$ is connected to this line.

The signal on line 302 is applied to the base of transistor $T_8$ of register 1 via line 102 thereby turning-on this transistor. When transistor $T_8$ is turned-on capacitor 33 discharges through transistor $T_8$ and the stored signal is applied to the input of stage I of the register by means of the line 111. If there are additional stages before stage I shifting to these stages in a reverse direction may be continued by the switch closing and opening sequence just described with reference to reverse shifting from stage II to stage III. Recapping, that sequence is make $SW_2$, make $SW_1$, break $SW_2$, break $SW_1$.

Figure 2:
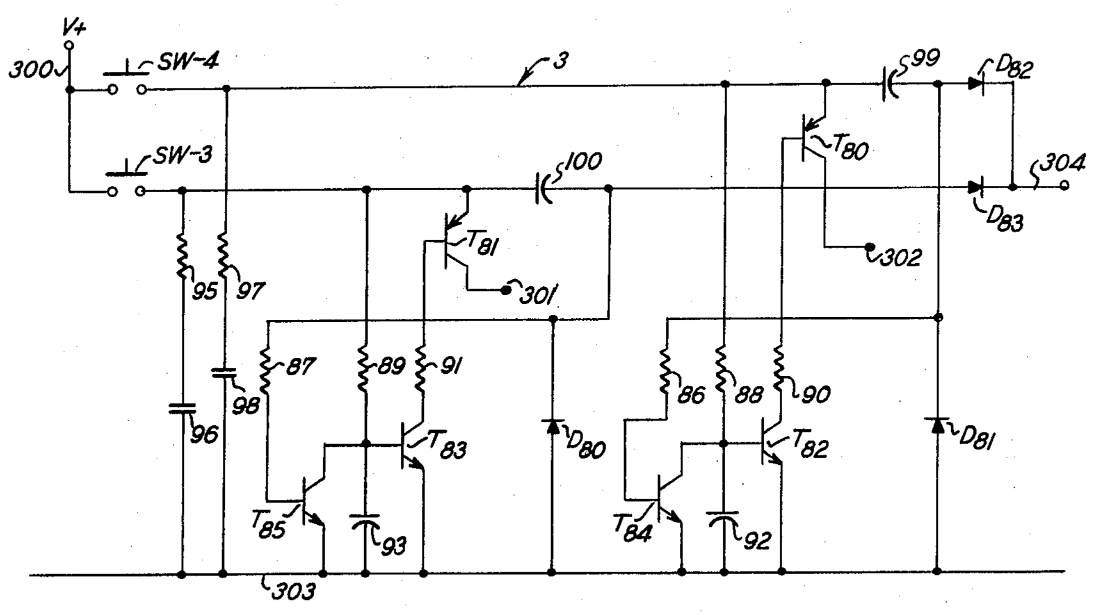
FIG. 2 is a schematic diagram of a second bidirectional shifter constructed in accordance with this invention.

FIG. 2 shows a forward and reverse shifter circuit 3 that does not use silicon controlled rectifiers. As was the case with shifter 2 of FIG. 1, lines 300, 301, 302, 303 and 304 of FIG. 2 are connected to lines 100, 101, 102, 103 and 104 respectively of shift register 1 shown in FIG. 1.

Shifter circuit 3 has a forward shift section and a reverse shift section. The forward shift section comprises the transistors $T_{81}$, $T_{83}$, and $T_{85}$ and the reverse section comprises the transistors $T_{80}$, $T_{82}$ and $T_{84}$. The forward and reverse sections are controlled by forward switch $SW_3$ and reverse switch $SW_4$ respectively. Both switches $SW_3$ and $SW_4$ are single pole — single throw switches each having one pole or terminal connected in common to V+ line 300. The series combination of capacitor 99 and diode $D_{82}$ is connected between line 304 and the second pole of switch $SW_4$. Similarly, the series combination of capacitor 100 and diode $D_{83}$ is connected between line 304 and the second pole of switch $SW_3$.

Transistor $T_{81}$ has its emitter connected to the second pole or terminal of switch $SW_3$ and its collector connected to forward line 301. The base of transistor $T_{81}$ is coupled to the collector of transistor $T_{83}$ through a resistor 91. The emitter of transistor $T_{83}$ is connected to line 303 and its base is connected to the collector of transistor $T_{85}$. The emitter of transistor $T_{85}$ is connected to line 303 and its base is coupled to the common point of capacitor 100 and diode $D_{83}$ through a resistor 87. A resistor 89 and a capacitor 93 are connected in series between line 303 and the second pole of switch $SW_3$. The base of transistor $T_8$ and the collector of transistor $T_{85}$ are tied to the common point of series connected resistor 89 and capacitor 93. A diode $D_{80}$ is connected between line 303 and the common point of series connected capacitor 100 and diode $D_{83}$. A resistor 95 and capacitor 96 are connected in series between the second pole of switch $SW_3$ and line 303. The circuitry just described constitutes the forward section of shifter 3.

In the reverse section, transistor $T_{80}$ has its emitter connected to the second pole of switch $SW_4$ and its collector connected to reverse line 302. The base of transistor $T_{80}$ is coupled to the collector of transistor $T_{82}$ through a resistor 90. A resistor 88 and a capacitor 92 are connected in series between the second pole of switch $SW_4$ and line 303. The base of transistor $T_{82}$ and the collector of transistor $T_{84}$ are both connected to the common point of series connected resistor 88 and capacitor 92. The emitter electrodes of transistors $T_{84}$ and $T_{82}$ are both connected to line 303. The base electrode of transistor $T_{84}$ is coupled to the common point of series connected capacitor 99 and diode $D_{82}$ through a resistor 86 and a diode $D_{81}$ is connected between the common point of capacitor 99 and diode $D_{82}$ and line 303. A resistor 97 and a capacitor 98 are connected in series between the second pole of switch $SW_4$ and line 303.

To describe the operation of the shifter circuit of FIG. 2 assume that this shifter is connected to shift register 1 shown in FIG. 1 with line 300 connected to line 100, line 301 connected to line 101, line 302 connected to line 102, line 303 connected to line 103 and line 304 connected to line 104. Also assume that $SCR_2$ of register 1 is conducting because a signal has been shifted out of stage I of register 1 and that shifting is to be in the forward direction. For forward shifting $SW_3$ is closed. When $SW_3$ is first closed a pulse appears on line 304. This pulse is applied to the base of transistor $T_{11}$ of register 2 in FIG. 1 by means of line 104. Transistor $T_{11}$ is turned-on by this pulse and transistor $T_2$ is cut-off because transistor $T_{11}$ is conducting. When transistor $T_2$ is cut-off, $SCR_2$ conducts through diode $D_4$ and charges capacitor 33. $SCR_2$ conducts until capacitor 33 is charged. When $SW_3$ is closed transistor $T_{85}$ also conducts because a pulse is applied to its base. When transistor $T_{85}$ conducts capacitor 93 does not charge. Through this time transistor $T_{83}$ is held off by the conduction of transistor $T_{85}$ and transistor $T_{81}$ is off because transistor $T_{83}$ is off.

When the pulse on the base of transistor $T_{85}$ terminates, this transistor cuts-off; capacitor 93 begins to charge and when sufficiently charged transistors $T_{83}$ and $T_{81}$ are rendered conductive. When both transistors $T_{83}$ and $T_{81}$ are conductive a signal will appear on line 301. This signal is transmitted to the base of transistor $T_5$ by a line 301. Transistor $T_5$ will then conduct; capacitor 33 will discharge through this transistor; and the signal stored in capacitor 33 is thus shifted to the input of stage III. Thus, the signal in stage II has been shifted in a forward direction to stage III. Shifting from stage to stage in a forward direction is thus accomplished by the closing of switch $SW_3$ each time a shift is to occur.

Shifting in the reverse direction is accomplished in a similar manner by the closing and opening of switch $SW_4$. Assume that the SCR of stage III is conducting because of the forward shift described above and that reverse shifting is now desired. Switch $SW_4$ is closed; a pulse appears on line 304 and this pulse turns-on the switching transistor of stage III (the transistor of stage III that is equivalent to $T_{11}$ of stage II). The storage capacitor of stage III (the capacitor of stage III that is equivalent to capacitor 33 of stage II) is charged by the SCR of this stage when its switching transistor turns-on. The SCR of stage III cuts-off when its storage capacitor is charged. While switch $SW_4$ is closed transistor $T_{84}$ is conducting and transistors $T_{82}$ and $T_{80}$ are not conducting.

When the pulse on the base of transistor $T_{84}$ terminates, transistor $T_{84}$ is cut-off; capacitor 92 charges and when sufficiently charged transistors $T_{80}$ and $T_{82}$ are rendered conductive. When transistors $T_{82}$ and $T_{80}$ are conducting, an output signal appears on line 302. This signal is transmitted to the base of the reverse transfer transistor of stage III (the transistor of stage III that is equivalent to transistor $T_8$ of stage II). The reverse transfer transistor of stage III is therefore turned-on and the storage capacitor of stage III is discharged through this transistor. The stored signal from the storage capacitor is applied to the input of stage II by means of the line 112. Thus, the signal in stage III is shifted in reverse to stage II and turns-on $SCR_2$.

If one desires to continue switching in a reverse direction from stage II to stage I switch $SW_4$ is re-opened and again closed thereby applying a pulse from line 304 to transistor $T_{11}$ to turn-on this transistor. Capacitor 33 is charged when transistor $T_{11}$ conducts. A pulse now appears on line 302 because the pulse on the base of transistors $T_{84}$ has terminated. This pulse is transmitted to transistor $T_8$ which now conducts and discharges capacitor 33. The signal stored in capacitor 33 is transmitted to the input of stage I by a line 111.

Figure 3:
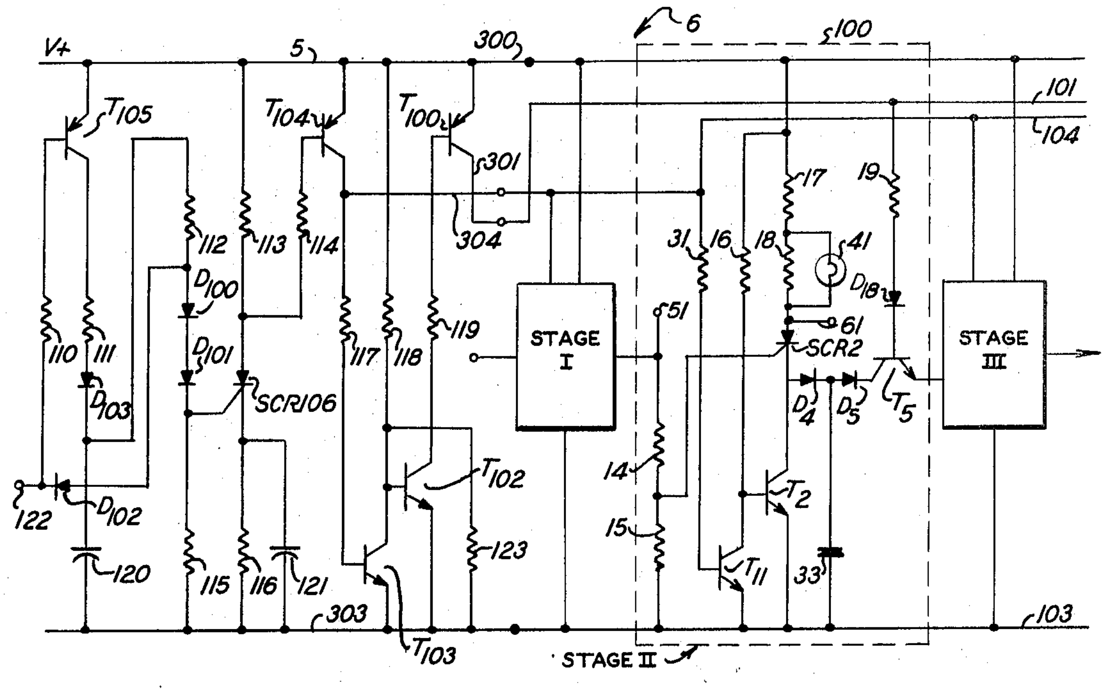
FIG. 3 is a schematic diagram of a proximity unidirectional shifter and in addition shows in block and schematic diagram form a forward shift register that can be used with the shifter.

The two shifters just described are capable of shifting a reversible register in both the forward and reverse directions. The shifter circuit 5 shown in FIG. 3 is limited to unidirectional shifting. That is this shifter circuit is limited to the type of shift registers disclosed in my said copending forward shift register application. In this respect it should be obvious from the above description of the shifter circuits of FIGS. 1 and 2 that one-half of the circuit of FIG. 2 and one-half of the circuit of FIG. 1 plus the control circuitry can be used for unidirectional shifting.

In addition to shifter circuit 5 a shift register 6 is also shown in FIG. 3. As is the case in FIG. 1, two stages, the stages I and III of register 6 are shown in block diagram form and one stage, the stage II, is shown in schematic diagram form. Stages I and III are identical to stage II and therefore only one stage is shown in detail. Shift register 6 is identical to the shift register shown in FIG. 2 of my said copending shift register-ring counter application. Note also that shift register 6 of FIG. 3 is similar to shift register 1 of FIG. 1. Shift register 6 does not contain the reverse transfer transistor $T_8$ of shift register 1 and therefore reverse line 102 is also not needed in shifter 6. The like parts of the two shift registers have like numbers in the two figures.

Since the like parts of shift register 1 and shift register 6 have like numbers and since the components in the two registers are identically interconnected, a detailed description of register 6 is not considered necessary. Describing register 6 in detail would merely repeat the detailed description of register 1 given above less the description of transistor $T_8$ and its associated circuit components and line 104.

Shifter circuit 5 of FIG. 3 comprises the transistors $T_{100}$, $T_{102}$, $T_{103}$, $T_{104}$ and $T_{105}$. Transistor $T_{105}$ has its emitter connected to V+ line 300 and its collector to line 303 through the series combination of a resistor 111, a diode $D_{103}$ and a capacitor 120. The base of transistor $T_{105}$ is connected to the input terminal 122. Input terminal 122 is connected to the output of a sensing device (not shown) such as a proximity detector. The gate electrode of the silicon controlled rectifier $SCR_{106}$ is coupled to input terminal 122 through the series combination of the diodes $D_{101}$, $D_{100}$ and $D_{102}$. A resistor 115 is connected between the gate electrode of $SCR_{106}$ and line 103. A resistor 112 is connected between the common point of diode $D_{103}$ and capacitor 120 and the common point of diodes $D_{100}$ and $D_{102}$. A parallel RC circuit comprising the resistor 116 and the capacitor 121 is connected between the cathode of $SCR_{106}$ and line 303. A resistor 113 is connected between the V+ line 300 and the anode of $SCR_{106}$. The anode of $SCR_{106}$ is also coupled to the base electrode of transistor $T_{104}$ through a resistor 114. Transistor $T_{104}$ has its emitter connected to V+ line 300 and its collector coupled to the base of transistor $T_{103}$ through a resistor 117. Transistor $T_{103}$ has its emitter connected to line 103 and its collector connected to the base of transistor $T_{102}$. The collector base connection of transistor $T_{102}$ and $T_{103}$ is coupled to V+ line 300 through a resistor 118 and to line 303 through a resistor 123. Transistor $T_{102}$ has its emitter connected to line 303 and its collector coupled to the base of transistor $T_{100}$ through a resistor 119. Transistor $T_{100}$ has its emitter connected to V+ line 300 and its collector connected to line 301. The collector electrode of transistor $T_{104}$ is connected to line 304.

To describe the operation of shifter circuit 5 it will be assumed that $SCR_2$ of shift register 6 is conducting and that input terminal 122 of shifter circuit 5 is connected to the output of a proximity sensor such as the Namco proximity sensor. The proximity sensor operates in such a manner that terminal 122 is at ground when it detects the presence of an object. When terminal 122 is at ground transistor $T_{105}$ will conduct; capacitor 120 will be charged; and $SCR_{106}$ is held off. As soon as terminal 122 goes above ground $SCR_{106}$ will conduct thereby turning on transistors $T_{104}$ and $T_{103}$. When transistor $T_{104}$ is conducting an output voltage appears on line 304 and this voltage is transmitted to the base of transistor $T_{11}$ of shift register 6. Transistor $T_{11}$ is turned on by this voltage and $SCR_2$ then charges capacitor 33. While transistors $T_{104}$ and $T_{103}$ are conducting, transistors $T_{102}$ and $T_{100}$ are held off. $SCR_{106}$ continues to conduct until capacitor 121 is charged. At that point in time $SCR_{106}$ cuts off and transistors $T_{104}$ and $T_{103}$ are also cut off. When transistor $T_{103}$ is cut off, transistor $T_{102}$ is rendered conductive and turns-on transistor $T_{100}$. When transistors $T_{100}$ and $T_{102}$ are conducting an output voltage appears on line 301. This voltage is transmitted to the base of transistor $T_5$ of shift register 6 by a line 101 and turns-on transistor $T_5$. When transistor $T_5$ conducts capacitor 33 is discharged through this transistor and an input signal is applied to stage III. Shifting from stage to stage is conducted in the manner just described.

Figure 4:
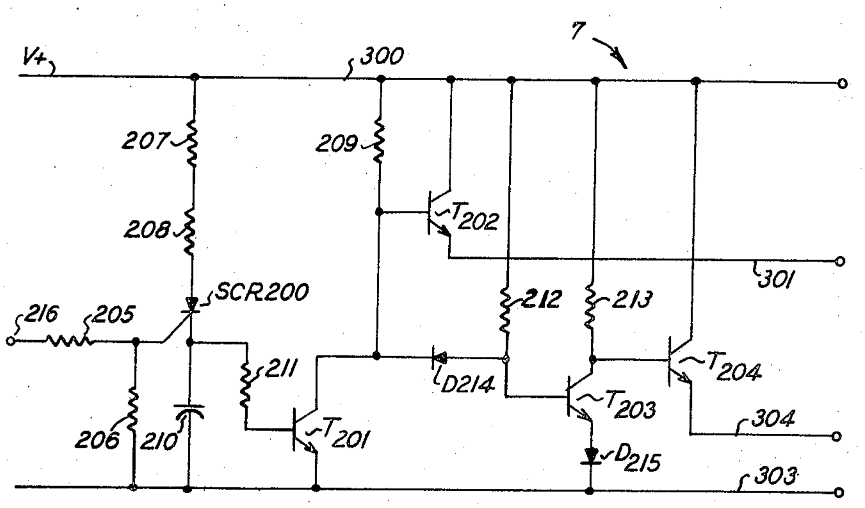
FIG. 4 is a schematic diagram of a second unidirectional shifter constructed in accordance with this invention.

FIG. 4 shows a second unidirectional shifter circuit 7 comprising a silicon controlled rectifier 200 and the transistors $T_{201}$, $T_{202}$, $T_{203}$ and $T_{204}$. Again V+ line 300, line 301 line 303 and line 304 are provided. These lines would be connected to lines 100, 101, 103 and 104 respectively of shift register 6 of FIG. 3. The gate of $SCR_{200}$ is coupled to an input terminal 216 through the resistors 205 and 206. The anode of $SCR_{200}$ is coupled to V+ line 300 through the series combination of the resistors 207 and 208. The cathode of $SCR_{200}$ is coupled to line 303 through the capacitor 210. The cathode of $SCR_{200}$ is also coupled to the base of transistor $T_{203}$ through a resistor 211. Transistor $T_{201}$ has its emitter connected to line 303 and its collector connected to the base of transistor $T_{202}$. The collector base connection of transistors $T_{201}$ and $T_{202}$ is coupled to line 300 through a resistor 209 and to the base of transistor $T_{203}$ through a diode $D_{214}$. The base of transistor $T_{203}$ is coupled to V+ line 300 through a resistor 212. Transistor $T_{203}$ has its emitter coupled to line 303 through a diode $D_{215}$ and its collector connected to the base of transistor $T_{204}$. The collector base connection of transistors $T_{203}$ and $T_{204}$ is coupled to V+ line 300 through a resistor 213. Transistor $T_{204}$ has its collector connected to V+ line 300 and its emitter connected to line 304. Similarly, transistor $T_{202}$ has its collector connected to V+ line 300 and its emitter connected to line 301.

To describe the operation of the shifter circuit 7 assume that $SCR_2$ of shift register 6 is conducting. When $SCR_{200}$ is non-conducting a voltage appears on line 301. Thus, a voltage normally appears on line 301. If now a pulse is applied to terminal 216 $SCR_{200}$ will be turned-on and transistor $T_{201}$ will be rendered conductive. When transistor $T_{201}$ conducts transistor $T_{202}$ is cut-off because its base is clamped to ground. During this time transistor $T_{203}$ is also rendered nonconductive. Therefore transistor $T_{204}$ conducts and a voltage is generated on line 304. This voltage is transmitted to switching transistor $T_{11}$ via line 104 and turns-on this transistor. When transistor $T_{11}$ is on capacitor 33 is charged by $SCR_2$ through diode $D_4$. $SCR_{200}$ will eventually cut-off due to the charge built up on capacitor 210. Shortly thereafter transistor $T_{201}$ will be cut-off and transistors $T_{202}$ and $T_{203}$ will again be conductive. The voltage appearing on line 301 is transmitted via line 101 to the base of transistor $T_5$ and capacitor 33 is discharged through this transistor to place an input signal on the input of stage III. Note that in the shifter of FIG. 4 a voltage remains on line 301 at all times except when transistor $T_{201}$ is conducting and that a voltage is inhibited on line 304 when transistor $T_{203}$ is conducting.

Figure 5:
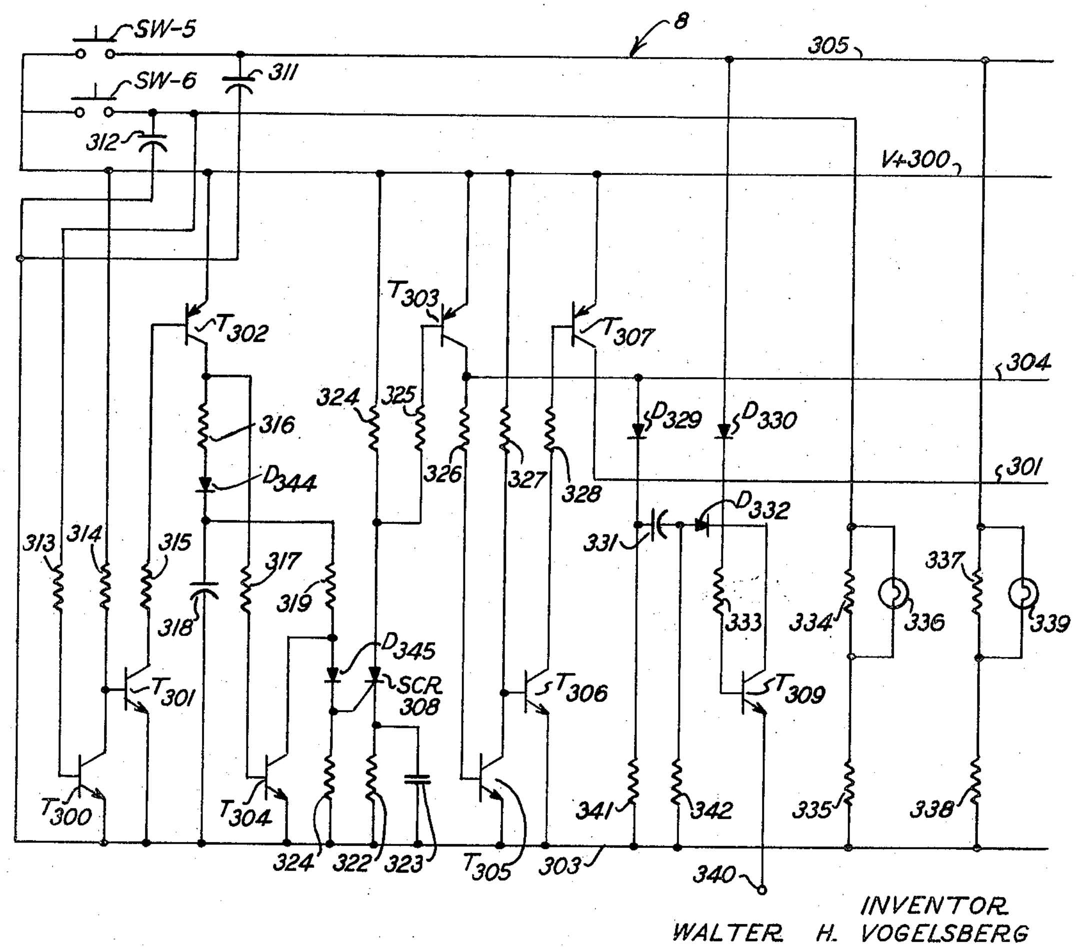
FIG. 5 is a schematic diagram of a third unidirectional shifter constructed in accordance with this invention.

FIG. 5 shows a unidirectional shifter and input convertor 8. Again the shifter line 300, 301, 303 and 304 would be connected to lines 100, 101, 103 and 104 respectively of shift register 6 of FIG. 3. The input circuit portion of FIG. 5 comprises the single pole — single throw switch $SW_5$ having one terminal connected to V+ line 300 and its second terminal connected to the line 305. Line 305 is coupled to the base of a transistor $T_{309}$ through the series combination of the diode $D_{330}$ and the resistor 333. The emitter of transistor $T_{309}$ is connected to output terminal 340. Output terminal 340 would be connected to an input terminal of the shift register. For example to input 51 of stage II of register 6. The resistors 337 and 338 are connected between lines 303 and 305 and the lamp 339 connected across resistor 337 is used to provide a visual indication that switch $SW_5$ has been closed. The collector of transistor $T_{309}$ is coupled to shifter line 304 through the diode $D_{332}$, the capacitor 331 and the diode $D_{329}$ all are connected in series. A resistor 342 is connected between line 303 and the common point of diode $D_{332}$ and capacitor 331. A resistor 341 is connected between the common point of capacitor 331 and diode $D_{329}$ and line 303.

The shifter circuit comprises transistors $T_{300}$, $T_{301}$, $T_{302}$, $T_{303}$, $T_{304}$, $T_{305}$, $T_{306}$ and $T_{307}$, switch $SW_6$ and silicon controlled rectifier $SCR_{308}$. Switch $SW_6$ is a single pole — single throw switch having one terminal connected to line 300. Transistor $T_{300}$ has the base coupled to the second terminal of switch $SW_6$ through the resistor 313 and its emitter connected to line 303. The base electrode of transistor $T_{300}$ is connected to the base electrode of transistor $T_{301}$. This collector base connection is coupled to V+ line 300 through a resistor 314.

The emitter of transistor $T_{301}$ is connected to line 303 and the collector of this transistor is coupled to the base of transistor $T_{302}$ through the resistor 315. Transistor $T_{302}$ has its emitter connected to V+ line 300 and its collector coupled to line 303 through the series combination of a resistor 316, a diode $D_{344}$ and a capacitor 318. The collector of transistor $T_{302}$ is also connected to the base of transistor $T_{304}$. The series combination of the resistor 319, the diode $D_{345}$ and the resistor 320 is connected between the common point of diode $D_{344}$ and capacitor 318 and line 303.

Transistor $T_{304}$ has its emitter connected to line 303 and its collector connected to the common point of resistor 319 and diode $D_{345}$. The gate of $SCR_{308}$ is connected to the common point of diode $D_{345}$ and resistor 320.

The anode of $SCR_{308}$ is coupled to V+ line 300 through a resistor 324 and to the base of transistor $T_{303}$ through a resistor 325. Line 304 is also connected to the base of transistor $T_{303}$.

Transistor $T_{303}$ has its emitter connected to V+ line 300 and its collector coupled to the base of transistor $T_{305}$ through a resistor 326. Transistor $T_{305}$ has its emitter connected to line 303 and its collector connected to the base of transistor $T_{306}$. This collector base connection is coupled to V+ line 300 through a resistor 327.

Transistor $T_{306}$ has its emitter connected to line 303 and its collector coupled to transistor $T_{307}$. Transistor $T_{307}$ has its emitter connected to V+ line 300 and its collector connected to line 301. A filter capacitor 311 is connected between the second pole of switch $SW_5$ and line 303 and a second filter capacitor 312 is connected between the second pole of switch $SW_6$ and line 303.

A lamp circuit that indicates when switch $SW_6$ is closed comprises a pair of resistors 334 and 335 connected in series between the second pole of switch $SW_6$ and line 303 and a lamp 336 connected across resistor 334. Lamp 336 ignites when switch $SW_6$ is closed.

To describe the operation of shifter 8 assume that $SCR_2$ of register 6 is conducting. With switch $SW_6$ open, transistors $T_{301}$ $T_{302}$, $T_{304}$, $T_{306}$ and $T_{307}$ are conducting. During this time capacitor 318 is being charged and $SCR_{308}$ is off because transistor $T_{304}$ is conducting.

If now switch $SW_6$ is closed transistor $T_{300}$ will conduct; lamp 336 will ignite; transistors $T_{301}$, $T_{302}$ and $T_{304}$ will be cut-off and $SCR_{308}$ will be turned-on. When $SCR_{308}$ is turned-on transistors $T_{303}$ and $T_{305}$ are turned-on and a voltage is present on line 304. This voltage is transmitted via line 104 to the base of transistor $T_{11}$ of shift register 6 of FIG. 3 and turns-on this transistor. When transistor $T_{11}$ is on $SCR_2$ conducts through diode $D_4$ to charge capacitor 33. $SCR_2$ conducts until capacitor 33 charges. Similarly, $SCR_{308}$ of shifter 7 conducts until capacitor 323 charges. As long as $SCR_{308}$ is conducting transistors $T_{306}$ and $T_{307}$ which were conducting when switch $SW_6$ was open are held off by the conduction of transistor $T_{305}$.

As soon as $SCR_{308}$ turns-off transistor $T_{305}$ stops conducting and transistors $T_{306}$ and $T_{307}$ again conduct. Conduction of transistors $T_{306}$ and $T_{307}$ places a voltage on line 301 that is transmitted to the base of transistor $T_5$ of register 6. This voltage turns-on transistor $T_5$ and capacitor 33 discharges through transistor $T_5$ to shift the stored signal from stage II to stage III of shift register 6. Shifting to the next stage is accomplished by again opening $SW_6$ and then reclosing $SW_6$.

The input circuit of FIG. 5 operates as follows: Switch $SW_5$ is first closed and switch $SW_6$ is then closed. When switch $SW_6$ is closed and transistor $T_{303}$ is conducting the voltage that appears on line 304 is also applied to the collector of transistor $T_{309}$. Since switch $SW_5$ is closed a voltage is applied to the base of transistor $T_{309}$, a voltage is generated at terminal 340. This terminal is connected to an input terminal, such as terminal 51 of stage II of register 6, to turn-on the SCR of that stage of the register. Note that in order to generate a register input signal voltage sufficient to turn-on a shifter register SCR a voltage must be applied to both the base and collector of transistor $T_{309}$. Also the collector of transistor $T_{309}$ can be coupled to line 301 and would then operate when a voltage is applied to line 301 and switch $SW_5$ is closed.

While a proximity sensor was specifically mentioned with respect to FIG. 3 it should be obvious that the switches, or inputs where no switches are shown of all the registers can be operated in response to any device such as a proximity sensor, a rotary cam, a photocell or the like. For example shifter circuit 2 of FIG. 1 is ideally suited for use with a rotary cam.

Such a cam, the cam 400 is shown in FIG. 1 as operably connected to switches $SW_1$ and $SW_2$. As cam 400 rotates in a clockwise direction it first closes switch $SW_2$ and then closes switch $SW_1$ while switch $SW_2$ is held closed. As cam 400 continues to rotate in a clockwise fashion switch $SW_2$ is first opened and then switch $SW_1$ is opened. In the counter-clockwise direction of rotation switch $SW_1$ is first closed; then switch $SW_2$ is closed; then switch $SW_1$ is opened; and then switch $SW_2$ is opened. Thus, recalling the operation of shifter 2 it is apparent that cam 400 provides a means of properly operating the shifter in both the forward and the reverse directions.

Shifter circuit 2 is ideally suited to cam operation because the circuit is insensitive to any rocking back and forth of the cam. The switches $SW_1$ and $SW_2$ must be closed in the proper sequence or the shift voltages will not appear as lines to 304 and 301 or 304 and 302 as the case may be. Recalling again the operation of shifter circuit 2, it will be remembered that capacitor 68 cannot be charged when $SW_2$ is closed because transistor $T_{44}$ is conducting and capacitor 69 cannot be charged when switch $SW_1$ is closed because transistor $T_{46}$ is conducting. In order for $SCR_{38}$ to fire, capacitor 68 must be charged and in order for $SCR_{39}$ to fire, capacitor 69 must be charged. Capacitors 68 and 69 provide when charged through transistors $T_{50}$ and $T_{40}$ respectively the voltage necessary to turn-on $SCR_{38}$ and $SCR_{39}$ respectively.

While the invention has been described with reference to specific embodiments it will be apparent to those skilled in the art that various changes and modifications can be made to the embodiments disclosed without departing from the spirit and scope of the invention as defined in the claims.

What is claimed is:

1. A shifter circuit comprising: a voltage source, a first transmission line; a second transmission line; a third transmission line and a common potential line; first and second "on"–"off" switches; a first silicon controlled rectifier; a second silicon controlled rectifier; means coupled to the gate electrode of said first silicon controlled rectifier for turning on said first SCR when said first and second switches are closed and opened in a first particular sequence; means coupled to the anode of said first SCR for applying a voltage to said first transmission line when said first SCR is conducting; means coupled to the cathode of said first SCR for preventing a voltage from appearing on said second transmission line when said first SCR is conducting; means coupled to said second SCR for turning on said second SCR when said first and second switches are closed and opened in a second particular sequence that is the reverse of said first particular sequence; means coupled to said first and second switches for preventing the turning on of said first and second SCR's when said first and second switches are not closed in said first and second sequences respectively; means coupled to the anode of said second SCR for applying a voltage to said first transmission line when said second SCR is conducting; means coupled to the cathode of said second SCR for preventing a voltage from appearing on said third transmission line when said voltage is applied to said first transmission line due to the conduction of said second SCR; first means coupled to the cathode of said first SCR for cutting off said first SCR; second means coupled to the cathode of said first SCR for applying a voltage to said second transmission line when said first SCR is cut off; first means coupled to the cathode of said second SCR for cutting off said second SCR; second means coupled to the cathode of said second SCR for applying a voltage to said third transmission line when said second SCR is cut off; and separate means for coupling the cathode of said SCR to said common potential line.

2. A shifter circuit comprising:

a. input signal voltage means including a first switch and a second switch;

b. a first output line;

c. a second output line;

d. means responsive to the actuation of said input signal voltage means for applying a voltage of a given duration on said first output line;

e. charge storage means;

f. means responsive to the actuation of said signal input voltage means for charging said charge storage means;

g. means responding when a given charge has accumulated on said charge storage means for applying a voltage on said second output line, said voltage on said first output line having gone substantially to zero before said voltage is applied to said second output line, said voltage applied on said first output line being applied on said first output line and then said voltage applied on said second output line being applied on said second output line after said voltage on said first output line has gone to said substantially zero only when said first and said second switches are closed and opened in the following sequence: close said first switch, close said second switch, open said first switch and open said second switch; and h. means to inhibit a voltage on said second output line during the time said voltage is present on said first output line.

3. A shifter circuit comprising:

a. input signal voltage means;

b. a first output line;

c. a second output line;

d. means responsive to the actuation of said input signal voltage means for applying a voltage of a given duration on said first output line;

e. charge storage means;

f. means responsive to said actuation of said signal input voltage means for charging said charge storage means;

g. means responding when a given charge has accumulated on said charge storage means for applying a voltage on said second output line, said voltage on said first output line having gone substantially to zero before said voltage is applied to said second output line;

h. means to inhibit a voltage on said second output line during the time said voltage is present on said first output line;

i. a third output line;

j. means responsive to the actuation of said input signal voltage means for applying a second voltage on said first output line;

k. second charge storage means;

l. means responsive to the actuation of said input signal voltage means for charging said second charge storage means, said first charge storage means receiving no charge when said second charge storage means is being charged;

m. means responding when a given charge has accumulated on said second charge storage means for applying a voltage on said third output line, said second voltage on said first output line having gone substantially to zero before said voltage is applied on said third output line; and n. means for inhibiting a voltage on said third output line when said second voltage is present on said first output line.

4. A shifter circuit as defined in claim 3 wherein said signal input voltage means includes first and second switches and wherein said second voltage is applied to said first output line and then said voltage is applied to said third output line after said second voltage has gone to substantially zero only when said first and second switches are closed and opened in the following sequence: close said second switch, close said first switch, open said second switch, open said first switch.

5. A shifter circuit as defined in claim 4 wherein said voltage is applied to said first output line and then said voltage is applied to said second output after said voltage on said first output line has gone to substantially zero only when said first and second switches are opened and closed in the following sequence: close said first switch, close said second switch, open said first switch, open said second switch.

6. A shifter circuit as defined in claim 3 wherein said input signal voltage means includes a first switch and said input signal voltage means is actuated by the closing of said first switch, said means for applying a voltage on said first output line responding upon the closure of said first switch.

7. A shifter circuit as defined in claim 6 wherein said input signal voltage means further includes a second switch and said input signal means is also actuated by closing said second switch, said means for applying a second voltage on said first output line responding upon the closure of said second switch, said second switch remaining open when said first switch is closed and first switch remaining open when said second switch is closed.

8. A shifter circuit as defined in claim 3 in combination with a forward and reverse shift register, said shift register being operative to shift in a forward direction in response to said voltage on said first output line and said voltage on said second output line and being operative to shift in a reverse direction in response to said second voltage on said first output line and said voltage on said third output line.

9. A shift register with shifter circuit comprising:

a. a shift register operative to shift in response to both a voltage on a first line and a voltage on a second line;

b. input signal means;

c. switch means to actuate said input signal means;

d. a controlled rectifier having a cathode, an anode, and a gate; and e. time delay circuitry operative in response to conduction across said controlled rectifier, means responsive to the actuation of said input signal means for generating a voltage on said first output line and for initiating conduction across said controlled rectifier, and means operative when conditioned in response to the status of said time delay circuitry produced by a predetermined period of operation for generating a voltage on said second output line.

10. A shift register with shifter circuit as in claim 9 wherein said controlled rectifier and said time delay circuitry are connected in circuit with a source of operating voltage and actuation of said input signal means produced an effective gating signal to said gate of said controlled rectifier.

11. A shift register with shifter circuit as in claim 9 wherein said switch means comprise first switch means and second switch means and also comprise second time delay circuitry operative in response to actuation of said first switch means, means operative when conditioned in response to the status of said second time delay circuitry produced by a predetermined period of operation to partially complete a circuit for producing conduction across said controlled rectifier, and means operative in response to actuation of said second switch means while said partially complete condition exists to complete said partially complete circuitry.

12. A shift register with shifter circuit as in claim 11 also comprising means operative to inhibit operation of said second time delay circuitry, operative in response to actuation of said second switch means.

13. A shifter circuit comprising:

a. signal input means;

b. forward shift circuit means responsive to said signal input means for generating a first voltage and a second voltage; and c. reverse shift circuit means responsive to said signal input means for generating said first voltage and a third voltage, said input signal means including a first and a second switch, said forward shift circuit means being responsive to a first sequence of opening and closing said first and second switches and said reverse shift circuit means being responsive to a sequence of opening and closing said first and second switches that is reverse of said first sequence of opening and closing of said switches.

14. A shifter circuit comprising:

a. input signal means, and means responsive to the actuation of said input signal means for generating a first voltage on a first output line and a second voltage on a second output line, said input signal means including a first switch having a switch arm and a switch contact and a second switch having a switch arm and a switch contact, said means for generating said first and second voltages being responsive to a set sequence of actuation of said first and second switches;

b. means responsive to the actuation of said first and second switches in a reverse sequence from said set sequence for generating said first voltage on said first output line and a third voltage on a third output line, said means for generating said first and second voltages including a first silicon controlled rectifier having an anode, a cathode and a gate electrode and said means for generating said first and third voltages including a second silicon controlled rectifier having an anode, a cathode and a gate electrode;

c. means to couple said anode of said first silicon controlled rectifier to said switch contact of said first switch and to said switch contact of said second switch;

d. means to couple said anode of said second silicon controlled rectifier to said switch contact of said first switch and to said switch contact of said second switch;

e. means to couple said cathode of said first silicon controlled rectifier to a common potential point;

f. means to couple said cathode of said second silicon controlled rectifier to said common potential point;

g. means to couple said gate electrode of said first silicon controlled rectifier to said switch arm of said second switch; and h. means to couple said gate electrode of said second silicon controlled rectifier to said switch arm of said first switch.

15. A shifter circuit comprising:

a. input signal voltage means including an input terminal;

b. a first output line;
c. a second output line;
d. means responsive to the actuation of said input signal voltage means for applying a voltage of a given duration on said first output line, said input signal voltage means being actuated by said input terminal first going to ground potential and then rising above ground potential;
e. charge storage means;
f. means responsive to said actuation of said signal input voltage means for charging said charge storage means;
g. means responding when a given charge has accumulated on said charge storage means for applying a voltage on said second output line, said voltage on said first output line having gone substantially to zero before said voltage is applied to said second output line; and
h. means to inhibit a voltage on said second output line during the time said voltage is present on said first output line.

16. A shifter circuit comprising:
a. input signal voltage means;
b. a first output line;
c. a second output line;
d. means responsive to the actuation of said input signal voltage means for applying a voltage of a given duration on said first output line;
e. charge storage means;
f. means responsive to said actuation of said signal input voltage means for charging said charge storage means;
g. means responding when a given charge has accumulated on said charge storage means for applying a voltage on said second output line, said voltage on said first output line having gone substantially to zero before said voltage is applied to said second output line; and
h. means to inhibit a voltage on said second output line during the time said voltage is present on said first output line; in combination with a shift register, said shift register being operative to shift in response to both said voltage on said first output line and said voltage on said second output line.

17. A shifter circuit comprising:
a. input signal voltage means, said input signal voltage means including a switch, said input signal voltage means being actuated by the closing of said switch;
b. a first output line;
c. a second output line;
d. means responsive to the actuation of said input signal voltage means for applying a voltage of a given duration on said first output line;
e. charge storage means;
f. means responsive to said actuation of said signal input voltage means for charging said charge storage means;
g. means responding when a given charge has accumulated on said charge storage means for applying a voltage on said second output line, said voltage on said first output line having gone substantially to zero before said voltage is applied to said second output line;
h. means to inhibit a voltage on said second output line during the time said voltage is present on said first output line;
i. an input converter circuit comprising a transistor having a base electrode, an emitter electrode and a collector electrode;
j. means to apply a voltage on said collector electrode of said transistor upon the closing of said switch; and
k. means to apply a voltage on said base electrode of said transistor, whereby a signal voltage is generated on said emitter electrode of said transistor upon the application of said voltage upon said collector electrode together with the application of said voltage on said base electrode.

* * * * *